USOO5519081A

United States Patent [19]
Ashton et al.

[11] Patent Number: 5,519,081
[45] Date of Patent: * May 21, 1996

[54] POLYMERISABLE COMPOSITIONS

[75] Inventors: David P. Ashton, Warrington; Geraldine A. Moorman, Leyland; Roger N. Rothon, Chester, all of England

[73] Assignee: Imperial Chemical Industries PLC, London, England

[*] Notice: The portion of the term of this patent subsequent to Jun. 15, 2014, has been disclaimed.

[21] Appl. No.: 199,221

[22] PCT Filed: Nov. 11, 1992

[86] PCT No.: PCT/GB92/02080

§ 371 Date: Jul. 26, 1994

§ 102(e) Date: Jul. 26, 1994

[87] PCT Pub. No.: WO93/10182

PCT Pub. Date: May 27, 1993

[30] Foreign Application Priority Data

Nov. 15, 1991 [GB] United Kingdom ............... 9124305
Nov. 15, 1991 [GB] United Kingdom ............... 9124309

[51] Int. Cl.$^6$ ............................ C08J 5/10; C08K 3/34; C08L 33/12
[52] U.S. Cl. ................. 524/493; 524/264; 524/382; 524/730; 524/779; 524/790; 525/288; 525/304; 525/305; 525/310
[58] Field of Search ................. 524/264, 382, 524/493, 730, 779, 790; 525/288, 304, 305, 310

[56] References Cited

U.S. PATENT DOCUMENTS 4,251,576  2/1981  Osborn et al. .................... 428/331
4,826,901  5/1989  Ittmann et al. ................... 524/145

FOREIGN PATENT DOCUMENTS 214551   3/1987  European Pat. Off. .
240044  10/1987  European Pat. Off. .
295004  12/1988  European Pat. Off. .
322055   6/1989  European Pat. Off. .
1493393 11/1977  United Kingdom .

Primary Examiner—Paul R. Michl
Assistant Examiner—U. K. Rajguru
Attorney, Agent, or Firm—Cushman Darby & Cushman

[57] ABSTRACT

Highly filled, curable compositions containing a curable liquid, e.g. methyl methacrylate; 20 to 80% by weight of a finely divided inorganic filler of defined particle size, e.g. silica; a functionalized polymer containing a low Tg component which is soluble in the curable liquid, e.g. a functionalized vinyl aromatic/conjugated diene block copolymer; and other components which diperse the filler in the curable liquid and couple the filler to the matrix can be used to produce cured composites which show improved resistance to stress induced by thermal cycling.

19 Claims, No Drawings

POLYMERISABLE COMPOSITIONS

This invention relates to highly filled, curable compositions suitable for moulding shaped articles and to the articles moulded therefrom.

BACKGROUND OF THE INVENTION

Composites of highly filled polymeric compositions are becoming increasingly used as materials of construction, particularly for kitchen sinks, kitchen surfaces and sanitaryware, because of their attractive appearance and hard wearing properties. Fluid, curable compositions containing high volumes of finely divided fillers suitable for forming such articles have been described in British Patent No. 1 493 393. This specification describes fluid, curable compositions wherein high volumes of filler of specified particle size are dispersed in a curable material using polymeric diapersants. The use of polymeric diapersants enable compositions to be obtained containing high volumes of finely divided fillers, for example 50% by volume, which have a remarkably low viscosity enabling the compositions to be readily handled for example by pumping. This low viscosity, in turn, enables the compositions to be sold as fluid dispersions which can be readily transported to fabricators who can mould articles in inexpensive low pressure moulds. Although some sedimentation will inevitably occur on storage, the polymeric diapersant maintains the filler particles in a state of stable, deflocculation so that the segment can be readily redispersed by mild agitation to give a dispersion in which the filler particles are substantially uniformly dispersed and will remain so whilst the composition is converted from a fluid dispersion to a fully cured composite. The presence of the polymeric diapersant, and its function of keeping the particles in a state of stable deflocculation, not only enables a low viscosity, redispersible dispersion to be obtained, but ensures that compatibility of the components is maintained as the composition is cured so that a cured product free from cracks and flaws is obtained.

It is also possible to fabricate moulded articles which have a viscosity too high to be of practical value as transportable, low viscosity, redispersible compositions. Nevertheless, these compositions are useful where the fabrication operation is carried out at the same location as the composition is prepared and where storage and redispersion are not a problem. These compositions must also contain fillers which are properly dispersed within the curable composition to avoid problems of flocculation and cracking on polymerisation.

Although these compositions are widely used in the applications described above a small proportion of moulded articles fail prematurely in service, when subjected to thermal cycling such as experienced by a kitchen sink subjected successively to very hot and cold water. Curable compositions have now been devised which provide moulded articles having an improved thermal resilience, i.e. an improved performance in respect of the damage tolerance thermal shock test and often in respect of the thermal shock test, both of which are hereinafter described.

SUMMARY OF THE INVENTION

According to a first aspect of the invention there is provided a highly filled, curable composition comprising (A) an addition polymerisable organic liquid comprising at least one olefinically unsaturated monomer and which addition polymerisable organic liquid on curing forms a solid polymer;

(B) 20 to 80% by volume of a finely divided particulate inorganic filler having a weight average particle size of less than 50 microns but not having a BET surface area of more than 30 $m^2.cm^{-3}$.

(C) a functionalised polymeric material soluble in the organic liquid but which is phase separated by the time the composition has been cured and containing at least one segment of low Tg polymeric material, optionally essentially free from saturation, which exhibits a Tg of less than 0° C. and preferably less than −25° C.;

D) a component which is capable of associating with and effecting anchoring to the particles of the inorganic filler and which provides a sufficiently large steric layer soluble in component A whereby filler particles are dispersed in the organic liquid; and (E) a component which will provide chemical bonding between the filler and polymer matrix formed by curing the polymerisable liquid.

Components C, D and E may be separate additive materials each providing the particular specified functions. Alternatively, more than one function may be provided in a single material, for example a single component may provide a dispersing

DESCRIPTION OF PREFERRED EMBODIMENTS

Preferred polymerisable organic liquids (A) have a viscosity below 1,000 centipoise, more preferably below 100 centipoise, as measured at ambient temperatures using a Brookfield viscometer. Particularly preferred polymerisable organic liquids have a viscosity of up to 50 centipoise. More particularly, the polymerisable organic liquid is one which cures to form a polymer having a glass transition temperature of at least 60° C. preferably of at least 80° C. and more preferably of at least 100° C.

Preferred polymerisable organic liquids comprise at least one mono olefinically unsaturated monomer which may be selected from any of the mono olefinically unsaturated monomers known in the art.

Suitable mono olefinically unsaturated monomers may be selected from the acrylic type monomers such as acrylic, methacrylic and chloroacrylic acids (i.e. $CH_2=CHClCO.OH$), acrylamide and methacrylamide, acrylonitrile and methacrylonitrile, alkoxyalkyl acrylamides and methacrylamides, e.g. butoxymethyl acrylamide and methoxymethyl methacrylamide, hydroxyalkyl acrylamides and methacrylamides, e.g. N-methylol acrylamide and methacrylamide, the metal acrylates and methacrylates, and the esters of acrylic, methacrylic and chloroacrylic acids with alcohols and phenols; the vinyl aromatic compounds, e.g. styrene and substituted derivatives thereof such as the halogenated derivates thereof and vinyl toluene; the vinyl esters, e.g. vinyl acetate, and vinyl pyrrolidone.

In a preferred polymerisable organic liquid, the at least one mono olefinically unsaturated monomer is an acrylic or methacrylic acid ester having the formula $CH_2=C(R)CO.ORR^2$ where R is H or methyl, especially methyl, and $R^2$ is optionally substituted hydrocarbyl (e.g. optionally halo or hydroxy substituted hydrocarbyl) and in particular is a $C_{1-8}$ alkyl, a $C_{6-10}$ cycloalkyl or a $C_{6-10}$ aryl group. Specific examples of such monomers include the non-substituted esters of acrylic and methacrylic acids such as methyl methacrylate, ethyl methacrylate, isopropyl methacrylate, isobutyl methacrylate, cyclohexyl methacrylate, isobornyl methacrylate, benzyl methacrylate, phenyl methacrylate and isobornyl acrylate and the substituted esters of acrylic and methacrylic acids such as hydroxyethyl methacrylate and hydroxypropyl methacrylate. More particularly, the mono olefinically unsaturated monomer incorporated in the polymerisable organic liquid is a $C_{1-8}$ alkyl ester of methacrylic acid. Methyl methacrylate is an especially preferred monomer.

The polymerisable organic liquid may comprise a mixture of mono olefinically unsaturated monomers, for example a mixture of the mono olefinically unsaturated monomers specified as preferred above.

The preferred polymerisable organic liquids may also comprise at least one polyolefinically unsaturated monomer so that the polymer which forms on curing the polymerisable organic liquid is a cross-linked polymer. Suitable polyolefinically unsaturated monomers may be selected from those known in the art. Preferred polyolefinically unsaturated monomers are the poly(meth)acrylate esters of an organic polyol and acrylic or methacrylic acid having the formula:

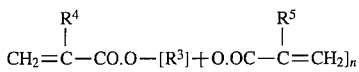

wherein $R^3$ is the hydroxy free residue of an organic polyol which comprised at least two hydroxyl groups in the molecule bonded to different carbon atoms;

$R^4$ and $R^5$ are each independently hydrogen or methyl: and n is an integer having a value of at least 1, preferably a value of from 1 to 3.

Suitable poly(meth)acrylates of this type include, inter alia, the mono-, di-, tri- and tetra-alkylene glycol di(meth)acrylates such as 1,3-butylene glycol dimethacrylate, 1,3-butylene glycol diacrylate, ethylene glycol diacrylate, ethylene glycol dimethacrylate, triethylene glycol diacrylate, triethylene glycol dimethacrylate and tetraethylene glycol dimethacrylate, and the trialkylolalkane tri-(meth)acrylates such as trimethylolpropane trimethacrylate and trimethylolpropane triacrylate. Other suitable poly-(meth)acrylates may be selected from the polyalkylene glycol di(meth)acrylates, such as polyethylene glycol dimethacrylate, the bisphenol di(meth)acrylates, such as Bisphenol A dimethacrylate, and the di(meth)acrylates of the alkoxylated bisphenols, such as the dimethacrylate of an ethoxylated and/or propoxylated derivative of Bisphenol A. The poly(meth)acrylate monomer may also be an acrylated or methacrylated epoxy resin, for example the product derived by reacting methacrylic acid with an epoxy resin which is the reaction product of a bisphenol, such ms Bisphenol A, and a halohydrin, such as epichlorohydrin. Mixtures of poly(meth)acrylate monomers may be used if desired.

More particularly, the poly(meth)acrylate monomer is a mono-, di-, tri- or tetra-alkylene glycol di(meth)acrylates or a trialkylolalkane tri(meth)acrylates, especially the former. A particularly preferred poly(meth)acrylate is ethylene glycol dimethacrylate.

The polymerisable organic liquid will usually comprise (by weight) from 0.2 to 20, for example from 0.5 to 20%, more usually from 0.5 to 15%, for example from 1.0 to 15%, by weight, and preferably from 0.5 to 10% for example from 1.0 to 10%, of the at least one polyolefinically unsaturated monomer, and usually from 99.8 to 80%, for example 99.5 to 80%, more usually from 99.5 to 85%, for example 99 to 85%, and preferably from 99.5 to 90%, for example from 99 to 90% by weight of the at least one olefinically unsaturated monomer.

However, certain polyolefinically unsaturated monomers may be employed in higher concentrations, e.g. the polyalkylene glycol di(meth)acrylates and the di(meth)acrylates of the alkoxylated bisphenol derivatives. A polymerisable organic liquid comprising such monomers may comprise up to 70% by weight thereof, e.g. up to 50% by weight.

Suitable inorganic fillers (B) may include amphoteric, basic and silicaceous fillers, and may be of natural or synethetic origin. The inorganic filler, if amphoteric, may, for example, be an oxide of this type. Suitable such inorganic fillers include oxides and hydroxides of aluminium, including hydrated alumina. The inorganic filler, if basic, may, for example, be an oxide, a hydroxide, a carbonate or a basic carbonate. Suitable inorganic fillers of this type include, inter alia, the oxides, hydroxides, carbonates and basic carbonates of alkaline earth metals and of zinc. Suitable silicaceous fillers include, inter alia, substantially pure silica, for example sand, quartz, cristobalite and precipitated or fused silica, or the metal silicates or aluminosilicates. Further useful inorganic fillers may be selected from the metal aluminates, phosphates, sulphates, sulphides and carbides. Silicaceous fillers are preferred, especially the silica fillers.

When the inorganic filler is to be used in a composition of the type described in British Patent Specification 1 493 393 providing a stably deflocculated redispersible dispersion the inorganic filler should be one in which the maximum size of any particle present is 100 microns, and at least 95% by number of the particles are of a size 10 microns or less, and where the particles have a surface area of from 30 $m^2.cm^{-3}$ to 1 $m^2.cm^{-3}$ (approximately from 10 $m^2.g^{-1}$ to 0.4 $m^2.g^{-1}$), preferably from 20 $m^2.cm^{-3}$ to 2 $m^2.cm^{-3}$ (approximately from 8.5 $m^2.g^{-1}$ to 0. $m^2.g^{-1}$), as determined by the B.E.T. nitrogen absorption method.

Preferably more than 99% by number of the particles are of a size 10 microns or less, and in general the nearer the number proportion of such particles approaches 100% the better, e.g. a proportion of 99.999% by number of a size 10 microns or less gives very satisfactory results. It is at the same time preferred that the maximum size of any particles present should be 75 microns, even more preferred that the maximum size should be 50 microns. The inorganic filler particles for use in the invention may have any form suitable for a filler, e.g. they may be of granular, fibrillar or laminar form.

In compositions having less exacting requirements, for example, where the composition is to be made up and cured in the same processing facility (in-house) and where it is not necessary to provide a dispersion which is readily pumpable from drums and which can be redispersed after storage, it is not necessary for the particle size to be so critical. For such compositions the BET particle surface area may be less than 1 $m^2.cm^{-3}$ and, for example, the weight average particle size may be as much as 50 microns or more. The BET particle surface area should be less than 30 $m^2.cm^{-3}$.

Curable compositions contain from 20 to 80% by volume of the finely divided particulate inorganic filler. Preferably the concentration of the inorganic filler is from 30% to 75% by volume and more preferably from 40 to 70% by volume of the total volume of the curable composition.

Where the inorganic filler is already available in the required particle size, the particles of inorganic filler can be dispersed in the curable compositions using techniques known in the art. Mixing processes such as roll milling or high shear mixing may be used to disperse the inorganic filler. For example, the inorganic filler may be mixed with the polymerisable organic liquid or a portion thereof to form a filler/liquid mixture into which is added the copolymer dispersant, e.g. as a solution in a component of the polymerisable organic liquid, with mixing. A further suitable technique involves blending the inorganic filler in a component of the polymerisable organic liquid and then blending the resulting mixture with the remaining components of the curable composition. Alternatively, the finely divided particles may be produced directly in the presence of the curable composition, or in a liquid component thereof, by comminution of coarse particles. Comminution of coarse material to yield smaller size particles can be readily carried out using conventional ball mills, stirred ball mills or vibratory mills.

Where the dispersion need not be limited to a stably deflocculated redispersible dispersion, i.e. a level of non-redispersion can be tolerated, the inorganic filler used to produce curable compositions my also comprise a coarse filler material, e.g. a filler material the particles of which have a mean size across their largest dimension of at least 100 microns, e.g. greater than 200 microns, and typically within the range 100 to b00 microns, e.g. 200 or 300 microns. Such compositions are useful where it is required to produce a surface rich in larger filler particles or where some special aesthetic effect such as a simulated granite effect is required.

The functionalised polymeric material (C) soluble in the organic liquid (A) containing at least one segment of low Tg polymeric material having a Tg of less than 0° C. may consist wholly of such a low Tg polymeric material. Alternatively, and preferably, the functionalised polymeric material may contain segments of such material, for example as in a block copolymer.

The at least one settlement of low Tg polymeric material may be essentially free from unsaturation. For example, the functionalised polymeric material may consist wholly of a homopolymer of 1,3 butadiene which has been hydrogenated or, preferably, may be a block copolymer obtained from an aromatic vinyl compound and a conjugated diene compound which has been selectively hydrogenated.

Functionalised versions of such polymers have been previously described and are commercially available in several forms. Selectively hydrogenated block copolymers modified with acid compounds are described, for example, in United States Patent Specification No. 4578429 and are commercially available from Shell Oil Company as the Kraton G series of polymers. United States Reissue Patent No. 27145 describes the production of selectively hydrogenated vinyl arene/conjugated diene block copolymers from which the functionalised block copolymers of U.S. Pat. No. 4 578 429 are prepared.

The term "essentially free from unsaturation" used in the present application is used in the sense that the aforementioned block copolymers have been hydrogenated to such an extent that the original unsaturation present has been reduced to a level at which their sensitivity to oxidation is minimised. This is achieved according to U.S. Pat. No. Re. 27145 by reducing the unsaturation of the conjugated diene polymer block to less than 10% of the original unsaturation. Preferably, the level of unsaturation is at an insignificant level.

The term "functionalised" used in the present application is used in the sense that the polymeric component contains, particularly as pendant groups, moieties which my be used as bonding agents in respect to the organic filler present in the curable composition. Preferred functional groups may be selected from carboxylic acid, carboxylic anhydride, hydroxyl, ester, imide, amide, amine, epoxy and acid chloride groups, carboxylic acid and anhydride being particularly preferred.

In a preferred form, the at least one segment of low Tg polymeric material is essentially free from unsaturation and the functional groups are selected from carboxylic acid, carboxylic anhydride, hydroxyl, ester, imide, amide, amine, epoxy and acid chloride groups, carboxylic acid and anhydride being preferred.

Where the functionalised polymeric material also comprises polymer segments which do not have a Tg of less than 0° C. it is preferred that the functional groups are associated with, e.g. pendant from, the at least one segment of low Tg polymeric material.

It is preferred that the at least one segment of low Tg polymeric material has a molecular weight (Mn) of at least 5000 although materials having a lower molecular weight are useful in improving overall properties particularly when they include a component providing either a dispersing effect or a coupling effect or both.

Suitable functionalised multi-block polymers for use as component C include functionalised vinyl aromatic/conjugated diene block copolymers and selectively hydrogenated variants thereof. The polymerised conjugated diets hydrocarbon block should preferably have an average molecular Weight (Mn) of at least 20,000 whereas the polymerised monoalkenyl aromatic hydrocarbon block should preferably have an average molecular weight of at least 2,000 and not more than 115,000. The weight percentage of the monoalkenyl aromatic block in the block copolymer is preferably less than 35% when the polymeric dispersant derived from these block copolymers is required to confer optimum resistance co thermal and mechanical shock.

The functionalised polymeric component C should be soluble in the polymerisable organic liquid but should phase separate whilst the composition is being cured so that it forms a separate phase which is present in the cured article. Component C may be present in the form of finely dispersed particles having a maximum dimension in the range from 0.01 microns to 5 microns but may also be present in the form of a co-continuous phase of material of irregular shape with a minimum dimension greater than 5 micron.

When it is desired to obtain a significant improvement in the damage tolerance test it is necessary that after the curing process the cured composition comprises the at least one segment of low Tg polymeric material in a noncross-linked state, thereby retaining its low Tg. It is generally possible to observe the presence of a low Tg component in a cured moulding using dynamic mechanical thermal analysis testing (DMTA) to provide a check that the low Tg component has not been changed during the curing process so as to lose its rubberiness.

In a second aspect the present invention provides the use of a functionalised polymeric material as an agent to improve the thermal resilience of a moulded article manufactured from a highly filled, curable composition comprising (A) an addition polymerisable organic liquid comprising at least one olefinically unsaturated monomer and which addition polymerisable organic liquid on curing forms a solid polymer;

(B) 20 to 80% by volume of a finely divided particulate inorganic filler having a weight average particle size of less than 50 microns but not having a BET surface area of more than $30m^2.cm^{-3}$;

(C) the functionalised polymeric material which is soluble in the organic liquid but which is phase separated by the time the composition has been cured and containing at least one segment of low Tg polymeric material, optionally essentially free from unsaturation, exhibiting a Tg of less than 0° C. and preferably less than −25° C.; and optionally (D) a component which is capable of associating with and effecting anchoring to the particles of the inorganic filler and which provides a sufficiently large steric layer soluble in component A whereby filler particles are dispersed in the organic liquid; and/or (E) a component which will provide chemical bonding between the filler and polymer matrix formed by curing the polymerisable liquid.

The component D comprises an amphipathic material in the sense that molecules of the material contain two distinct portions, a portion which is capable of associating with and effecting anchoring to the filler particles B, and a portion soluble in component A and having a sufficiently large steric volume in component A to achieve dispersion of the filler particles in component A.

Typically useful variations of component D are expensively described in British Patent Specification No. 1493393. The latter describes dispersing agents which are amphipathic substances containing (a) at least one chain-like component of molecular weight at least 500 which is solvated by the polymerisable organic liquid (A) and is also solvated by, or is compatible with, the oligomeric or polymeric products which result throughout the course of the curing operation from the polymerisable organic liquid, and (b) one or more groupings which are capable of associating with, and effecting anchoring to the particles of the inorganic filler (B). The chain-like component is solvated by the polymerisable organic liquid or its curing products in the sense that, if this component were an independent molecule, the polymerisable organic liquid or those products would be significantly better than theta-solvents for it; the nature of a theta-solvent is discussed in "Polymer Handbook" (ed. Brandrup and Immergut, Intersciene, 1966) and in "Principles of Polymer Chemistry, Chapters 12–14 (Flory:Cornell, 1953). More simply, the polymerisable organic liquid may be described as being a "good" solvent for the chain-like component.

The component D may itself contain a component which will effect a strong bond between the filler particles and the matrix, i.e. couple the filler particles and the matrix. Alternatively, a further separate component, E, may be included to provide this function.

The particular type of coupling or bonding agent to be used will depend upon the nature of the inorganic filler and of the polymerisable organic liquid. Suitable bonding agents are in general substances containing groups which can form a multiplicity of ionic, covalent or hydrogen bonds with the particle, and also groups which can react to form bonds with the polymer matrix. Suitable groups for bonding to particles having hydroxylic, metal oxide or silicaceous surfaces are, for example, the oligomeric hydrolysis products of alkoxy silanes, chlorosilanes and alkyl titanates as well as the trivalent chromium complexes or organic acids. Where the particle surface is of a basic character, as for example in the case of particles of alkaline earth metal carbonates or of metals such as aluminium, chromium and steel, suitable bonding groups are carboxylic acid groups. In the case of particles with acidic surfaces, such as those of kaolin, amine salt groups are suitable for bonding to the particles.

Groups suitable for bringing about bonding with the polymer matrix are typically those which co-react with the polymerisable organic liquid during the polymerisation stage. Thus an interfacial bonding agent containing an ethylenically unsaturated group is suitable for use with addition polymerisation systems involving vinyl, vinylidene and similar unsaturated monomers. An agent containing an amino, an oxirane or a carboxyl group is suitable for use with epoxy-group-containing compounds. Examples of suitable interfacial bonding agents include:

gamma-methacryloxypropyl trimethoxy silane
gamma-aminopropyl trimethoxysilane
gamma-glycidyl oxypropyl trimethoxysilane
vinyl triathoxysilane
vinyl triacetoxysilane
vinyl trichlorosilane
Acrylic and methacrylic acids and their metal salts
Methacrylatochromic chloride
Maleimidopropionic acid
Succinimidopropionic acid
4-Amonimethylpiperidine
Tetraisopropyl and tetrabutyl titanates The amounts of the interfacial bonding agent used are, in general those conventional in the art of polymeric materials reinforced with inorganic fillers. A suitable minimum usage for most applications is 0.001 g of bonding agent per square meter of filler particle surface area. If desired, a mixture of two or more interfacial bonding agents of the types described may be used.

Curable compositions may also comprise one or more preformed polymers which may be in solution in the polymerisable organic liquid, for example, a partially polymerised syrup of the polymerisable organic liquid. Alternatively they may be present in a state of dispersion therein. Preformed polymers may also be included as a thickening aid to adjust the viscosity of the curable compositions.

Curable compositions may also comprise any of the additives that are conventionally used in curable moulding compositions such as pigments, dyestuffs, mould release agents and polymerisation inhibitors.

Curable compositions are useful employed in the manufacture of moulded articles. Fluid curable compositions having a low viscosity obtainable using the dispersants of the invention are particularly suitable for moulding applications and, accordingly preferred curable compositions will have a viscosity, as measured when the filler is dispersed in the polymerisable organic liquid, of less than 5000 centipoise at ambient temperatures. More particularly, compositions having a viscosity, as measured when the filler is so dispersed, in the range of from 50 to 2000 centipoise and especially in the range of from 50 to 1000 centipoise are preferred.

In a third aspect of the present invention there is provided a moulded article formed by curing the curable composition of the first aspect of the invention.

Moulded articles may be fabricated using techniques conventional in the art. For example, the curable composition can be cast into a mould and then in-mould polymerised using a suitable catalyst to initiate the polymerisation reaction.

The polymerisable compositions may be cured in accordance with techniques conventional in the art of free radical addition polymerisation. The polymerisation may be initiated by a wide range of catalysts, but it is preferred to use a heat activated catalyst, particularly one which is activated at temperatures of from 30° to 120° C. The catalyst is preferably added immediately prior to curing the compositions; this may be particularily important where the catalyst is activated at temperatures below or around ambient. Suitable catalysts are well known to those skilled in the art and may include, for example, organic peroxides, such as dibenzoyl peroxide, diocatanoyl peroxide and di-t-butyl peroxide, which may be used in conjunction with an amine accelerator, e.g. N,N-diethylaniline or N,N-dimethyl-para-toluidine; the hydroperoxides, such as t-butyl hydroperoxide; the peroxydicarbonates, such as diisopropylperoxydicarbonate, di-n-propylperoxydicarbonate, di-(2-ethoxyethyl)-peroxydicarbonate, di-(methoxyisopropyl)-peroxydicarbonate, di-(2-ethylhexyl)-peroxydicarbonate and bis(4-t-butylcylcohexyl)peroxydicarbonate; and the peresters. The most preferred catalysts are the peroxydicarbonates. The catalyst is conveniently used in an mount ranging from 0.1% to 3.5% by weight based on the total weight of the polymerisable organic liquid.

It may be desirable during the filling of the mould to maintain the temperature of the mould surfaces below the temperature at which the catalyst is activated, so as to prevent premature polymerisation and gelation.

Prior to moulding, the internal mould surfaces may be coated with a release agent to prevent adhesion of the cured materials to the mould and to obtain a good surface finish. These polytetrafluoroethylene, silicone and polyvinylalcohol techniques are well known in the art. Examples of suitable external mould release agents include, inter alia, After the in-mould polymerisation is complete, the filled polymeric article may be subjected to an in-mould post-curing process, after which it is demoulded, or, alternatively, it may be demoulded immediately and then optionally subjected to a post-curing process.

The invention is further illustrated by reference to the following examples.

EXAMPLE 1

The following ingredients were mixed in a 25 liter drum and rolled at approximately 30 rpm for 24 hours.

| Methyl methacrylate | 7.43 kg |
| Ethylene glycol dimethacrylate | 0.092 kg |
| Kraton FG1901X (a maleinised ethylene/ butylene-styrene block copolymer available from the Shell Chemical Company) | 0.92 kg |
| Polymeric dispersant (95:5 methyl methacrylate/dimethylamino ethyl methacrylate, Mw 50,000 (GPC) | 0.22 kg |
| 3-(trimethoxysilyl)propylmethacrylate | 0.088 kg |
| Stearic acid | 0.045 kg |
| Cristobalite silica (mean weight average particle size 10 microns) | 22 kg |

A free flowing dispersion having a viscosity 300 centipoise measured on a Brookfield viscometer using a No. 3 spindle at 30 rpm.

The dispersion was cured in the form of plaques (dimensions 300 mm×300 mm×5 mm) and kitchen sinks after catalysing with 0.6% by weight of the dispersion of Perkadex 16 catalyst (bis(4-t-butyl-cyclohexyl)peroxydicarbonate) (obtainable from Akzo) using the appropriate moulds. The curing cycle for moulding plaques was 30 minutes at 60° C. followed by 45 minutes at 90° C. The curing cycle for moulding sinks was 80° C. on show face and 50° C. on back face for 15 minutes, followed by 100° C. on show face and 100° C. on back face for 15 minutes, the moulding pressure was held an 2 bar for 10 minutes followed by 4.5 bar for 20 minutes.

The plaques were cut into test pieces for measurement of modulus, failure stress, failure strain and impact strength. The test methods were three point bend flexural test, ASTMD790-71 and the Charpy unnotched impact test, ASTM D256 Method B.

The values measured are recorded below:

| Modulus | GPa | 10.6 |
| Failure Stress | MPa | 103 |
| Failure Strain | % | 2.2 |
| Impact Strength | kJ · m$^{-2}$ | 8.3 |

The thermal shock performance of the moulded sinks were assessed by the following method. Hot and cold water were alternately, and repeatedly, jetted onto the base of the sink: the sink was continually observed and the number of cycles to failure or damage was measured. Each heating and cooling cycle was as follows: hot water at 93° C.±2° C. was jetted onto the base of the sink for 90 seconds, followed by a dwell time of 30 seconds during which time there was no flow of water, then cold water 15° C.± was jetted onto the base of the sink for 90 seconds, followed by a further dwell time of 30 seconds.

The damage tolerance thermal shock test involved using the same heating and cooling cycle described above, but the sink was scratched by drawing a device in which a 'Stanley Knife Blade' was protruding by 1 mm from a flat surface across the show surface of the base of the sink. A scratch of length 2.5 cm was made at the point of impingement of the water jet. The sinks were observed during the thermal cycling and cycles to failure or damage were recorded.

In the damage tolerance thermal shock test minor damage was observed at 180 cycles, and failure occurred at 360 cycles.

Comparative Example A

The following ingredients were mixed into 25 liter drums and rolled at approximately 30 rpm for 24 hours.

| Methyl methacrylate | 8.03 kg |
| Ethylene glycol dimethacrylate | 0.092 kg |
| Polymeric dispersant (95:5 methyl methacrylate dimethylamino ethyl methacrylate, Mw 50,000 (GPC) | 0.21 kg |
| Polymethyl methacrylate Mw 500,000 (GPC) | 0.18 kg |
| Stearic acid | 0.045 kg |
| Cristobalite silica as used in Example 1 | 22 kg |

A free flowing dispersion was obtained having a viscosity of 410 centipoise measured by the method described in Example 1.

The dispersions were moulded and cured into a plaque and sinks as described in Example 1. The plaque was cut into specimens for mechanical property determination as described in Example 1. The values measured are recorded below:

| Modulus | GPa | 12.8 |
| Failure Stress | MPa | 64 |
| Failure Strain | % | 0.5 |
| Impact Strength | kJ · m$^{-2}$ | 2.0 |

Sinks were tested in the thermal shock test and failed on average (4 tests) after 90 cycles.

In the damage tolerance thermal shock test no minor damage was observed before catastrophic failure at 30 cycles.

Comparative Example B

The following ingredients were mixed into 25 liter drums and rolled at approximately 30 rpm for 24 hours.

| Methyl methacrylate | 8.03 kg |
|---|---|
| Ethylene glycol dimethacrylate | 0.092 kg |
| Polymeric dispersant (95:5 methyl methacrylate : dimethylamino ethyl methacrylate, Mw 50,000 (GPC) | 0.21 kg |
| Polymethyl methacrylate Mw 500,000 (GPC) | 0.18 kg |
| 3-(trimethoxysilyl)propylmethacrylate | 0.022 kg |
| Stearic acid | 0.045 kg |
| Cristobalite silica as used in Example 1 | 22 kg |

A free flowing dispersion was obtained having a viscosity of 410 centipoise measured by the method described in Example 1.

The dispersions were moulded and cured into a plaque and sinks as described in Example 1. The plaque was cut into specimens for mechanical property determination as described in Example 1. The values measured are recorded below.

| Modulus | GPa | 12.5 |
|---|---|---|
| Failure Stress | MPa | 115 |
| Failure Strain | % | 1.0 |
| Impact Strength | kJ · m$^{-2}$ | 5.0 |

Sinks were tested in the thermal shock test and failed on average (>25 tests) after 700 cycles.

In the damage tolerance thermal shock test no minor damage was observed before catastrophic failure occurred at 30 cycles.

EXAMPLE 2

The procedure of Example 1 was followed using a composition of the following ingredients:

| Methyl methacrylate | 7.45 kg |
|---|---|
| Ethylene glycol dimethacrylate | 0.092 kg |
| Kraton FG1901X | 0.92 kg |
| 3-(trimethoxysilyl)propylmethacrylate | 0.088 kg |
| Stearic acid | 0.045 kg |
| Cristobalite silica as used in Example 4 or 1 | 22 kg |

A free flowing dispersion was obtained, the viscosity measured by the method described in Example 1 was found to rise from 350 centipoise to 1020 centipoise over 7 days.

The following properties were measured using the test methods described in Example 1 on samples cut from moulded plaques:

| Modulus | GPa | 10.0 |
|---|---|---|
| Failure Stress | MPa | 95 |
| Failure Strain | % | 2.0 |
| Impact Strength | kJ · m$^{-2}$ | 6.3 |

Sinks were tested in the damage tolerance thermal shock test, minor damage was observed at 231 cycles, and failure occurred at 464 cycles.

Comparative Example C

The procedure of Example 1 was followed using a composition containing a non-functionalised soluble polymeric material and with the following ingredients:

| Methyl methacrylate | 7.55 kg |
|---|---|
| Ethylene glycol dimethacrylate | 0.092 kg |
| Kraton DX1300 a styrene/butadiene/styrene block copolymer available from the Shell Chemical Company | 0.61 kg |
| Polymeric dispersant (95:5 methyl methacrylate/dimethylamino ethyl methacrylate, Mw 50,000 (GPC) | 0.22 kg |
| 3-(trimethoxysilyl)propylmethacrylate | 0.088 kg |
| Stearic acid | 0.045 kg |
| Cristobalite silica as used in Example 1 | 22 kg |

A free flowing dispersion having a viscosity of 470 centipoise measured by the method described in Example 1 was obtained.

The following properties were measured on plaques and sinks moulded from this dispersion using the test methods described in Example 1 on samples cut from moulded plaques:

| Modulus | GPa | 10.2 |
|---|---|---|
| Failure Stress | MPa | 126 |
| Failure Strain | % | 1.8 |
| Impact Strength | kJ · m$^{-2}$ | 5.2 |

In the damage tolerance thermal shock test no minor damage was observed before catastrophic failure occurred at 61 cycles.

Comparative Example D

The following ingredients were mixed into 25 liter drums and rolled at approximately 30 rpm for 24 hours.

| Methyl methacrylate | 8.72 kg |
|---|---|
| Ethylene glycol dimethacrylate | 0.08 kg |
| Kraton G-1652 a styrene/ethylene/butadiene/styrene block copolymer available from the Shell Chemical Company | 0.69 kg |
| Polymeric dispersant (95:5 methyl methacrylate : dimethylamino ethyl methacrylate, Mw 50,000 (GPC) | 0.20 kg |
| 3-(trimethoxysilyl)propylmethacrylate | 0.080 kg |
| Stearic acid | 0.045 kg |
| Cristobalite silica as used in Example 1 | 20 kg |

A free flowing dispersion was obtained having a vosocisity of 760 centipoise measured by the method described in Example 1.

The dispersions were moulded and poured into a plaque and sinks as described in Example 1. The plaque was cut into specimens for mechanical property determination as described in Example 1. The values measured are recorded below:

| Modulus | GPa | 11.2 |
|---|---|---|
| Failure Stress | MPa | 101 |
| Failure Strain | % | 1.3 |
| Impact Strength | kJ · m$^{-2}$ | 5.0 |

In the damage tolerance thermal shock test minor damage was observed at 143 cycles, and failure occurred at 266 cycles.

EXAMPLE 3

The following ingredients were mixed in a 1 liter glass bottle and rolled at approximately 30 rpm for 24 hours:

| | | |
|---|---|---|
| Methyl methacrylate | 216.2 | g |
| Ethylene glycol dimethacrylate | 2.2 | g |
| Kraton FG1901X | 22.2 | g |
| 3-(trimethoxysilyl)propylmethacrylate | 0.15 | g |
| Aluminium hydroxide, Grade C308 of Sumitomo having a weight average particle size of 8 microns | 500 | g |

A free flowing dispersion was obtained, the viscosity was 150 centipoise measured by the method described in Example 1.

The following properties were measured using the test methods described in Example 1 on samples cut from moulded plaques:

| | | |
|---|---|---|
| Failure Strain | % | 2.6 |
| Impact Strength | kJ · m$^{-2}$ | 6.9 |

Comparative Example E

The following ingredients were mixed in a 1 liter bottle and rolled at approximately 30 rpm for 24 hours.

| | | |
|---|---|---|
| Methyl methacrylate | 216.2 | g |
| Ethylene glycol dimethacrylate | 2.2 | g |
| Polymeric dispersant (95:5 methyl methacrylate/dimethylamino ethyl methacrylate, Mw 50,000 (GPC)) | 1.85 | g |
| 3-(trimethoxysilyl)propylmethacrylate | 0.15 | g |
| Aluminum hydroxide, Grade C308 of Sumitomo having a weight average particle size of 8 microns. | 500 | g |

A free flowing dispersion was obtained the viscosity was 130 centipoise measured by the method described in Example 1.

The following properties were measured using the test methods described in Example 1 on samples cut from moulded plaques:

| | | |
|---|---|---|
| Failure Strain | % | 1.0 |
| Impact Strength | kJ · m$^{-2}$ | 2.7 |

Comparative Example F

A silylated polybutadiene was prepared by hydrosilylation of a polybutadiene of molecular weight 8000. 10 g of this product was dissolved in 130 g of the silica used in Example 1. After 30 minutes rolling the viscosity was greater than 10,000 centipoise as measured by the method described in Example 4. This procedure was repeated using a silylated polybutadiene available from Dynamit Nobel under product number PS076.5. After 30 minutes of rolling the mixture had a viscosity greater than 10,000 centipoise.

We claim:

1. A filled, curable composition comprising
   (A) an addition polymerisable organic liquid which on curing forms a solid polymer;
   (B) 20 to 80% by volume, based on the composition volume, of a finely divided inorganic particulate filler having a weight average particle size of less than 50 microns but not having a BET surface area of more than 30 m$^2$.cm$^{-3}$;
   (C) a functionalised polymeric material soluble in the organic liquid but which is phase separated by the time the composition has been cured and containing at least one segment of low Tg polymeric material which exhibits a Tg of less than 0° C.;
   (D) a component which is capable of associating with and effecting anchoring to the particles of the inorganic filler and which provides a steric volume soluble in component A whereby filler particles are dispersed in the organic liquid; and
   (E) a component which will provide chemical bonding between the filler and polymer matrix formed by curing the polymerisable organic liquid.

2. A curable composition as claimed in claim 1 wherein the polymerisable organic liquid (A) is one which cures to form a solid polymer having a glass transition temperature of at least 60° C.

3. A curable composition as claimed in either claim 1 or claim 2 wherein the polymerisable organic liquid (A) comprises at least one mono olefinically unsaturated monomer which is an acrylic or methacrylic acid ester having the formula CH$_2$=C(R)CO.OR$^2$ where R is H or methyl and R$^2$ is unsubstituted hydrocarbyl or hydrocarbyl substituted with halogen or hydroxyl.

4. A curable composition as claimed in claim 3 wherein the polymerisable organic liquid (A) comprises at least one polyolefinically unsaturated monomer so that the polymer which forms on curing the polymerisable organic liquid is a cross-linked polymer.

5. A curable composition as claimed in claim 4 wherein the least one polyolefinically unsaturated monomer is a poly(meth)acrylate ester of an organic polyol and (meth-)acrylic acid having the formula:

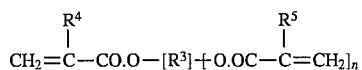

wherein
R$^3$ is the hydroxy free residue of an organic polyol which comprised at least two hydroxyl groups in the molecule bonded to different carbon atoms;
R$^4$ and R$^5$ are each independently hydrogen or methyl; and n is an integer having a value of at least 1, preferably a value of from 1 to 3.

6. A curable composition as claimed in claim 5 wherein the polymerisable organic liquid (A) comprises from 0.2 to 20% by weight of the at least one polyolefinically unsaturated monomer and from 99.8 to 80% by weight of the at least one mono olefinically unsaturated monomer.

7. A curable composition as claimed in claim 6 wherein the inorganic filler (B) is at least one amphoteric, basic or silicaceous filler.

8. A curable composition as claimed in claim 7 wherein the inorganic filler further comprises a coarse filler material.

9. A curable composition as claimed in claim 8 wherein the at least one segment of low Tg polymeric material is essentially free from unsaturation and the functional groups are selected from carboxylic acid, carboxylic anhydride, hydroxyl, ester, imide, amide, amine, epoxy and acid chloride groups.

10. A curable composition as claimed in claim 9 wherein the functionalised polymeric material comprises polymer segments which do not have a Tg of less than 0° C. and the functional groups are pendant from the at least one segment of low Tg polymeric material.

11. A curable composition as claimed in claim 10 wherein the at least one segment of low Tg polymeric material has a molecular weight (Mn) of at least 5000.

12. A curable composition as claimed in claim 11 wherein the functionalised polymeric material is a functionalised vinyl aromatic/conjugated diene block copolymer.

13. A curable composition as claimed in claim 12 wherein the functionalised polymeric material is in the form of finely dispersed particles having a maximum dimension from 0.01 microns to 5 microns.

14. A curable composition as claimed in claim 12 wherein the functionalised polymeric material is in the form of a co-continuous phase of material of irregular shape with a minimum dimension greater than 5 microns.

15. A curable composition as claimed in claim 14 wherein the component (D) also contains a component which can effect a chemical bond between the inorganic filler and a polymer matrix formed by curing the polymerisable organic liquid.

16. A filled, curable composition comprising
   (A) an addition polymerisable organic liquid comprising a mixture of methyl methacrylate and ethylene glycol dimethacrylate;
   (B) a finely divided inorganic particulate filler comprising cristobalite silica having a weight average particle size of less than 50 microns but not having a BET surface area of more than 30 $m^2.cm^3$;
   (C) a functionalised polymeric material soluble in the organic liquid but which is phase separated by the time the composition has been cured and containing at least one segment of low Tg polymeric material which exhibits a Tg of less than 0° C., and comprising a functionalised vinyl aromatic/conjugated diene block copolymer;
   (D) 3-(trimethoxysilyl)propylmethacrylate.

17. A cured composition prepared from a curable composition as claimed in claim 16.

18. A cured composition as claimed in claim 16 wherein at least some of the at least one segment of low Tg polymeric material is present in a noncross-linked state.

19. A moulded article of improved thermal resilience, said article being made from a filled, curable composition comprising
   (A) an addition polymerisable organic liquid which on curing forms a solid polymer;
   (B) 20 to 80% by volume, based on the the composition volume, of a finely divided inorganic particulate filler having a weight average particle size of less than 50 microns but not having a BET surface area of more than 30 $m^2.cm^{-3}$;
   (C) a functionalised polymeric material soluble in the organic liquid but which is phase separated by the time the composition has been cured and containing at least one segment of low Tg polymeric material exhibiting a Tg of less than 0° C.; and optionally
   (D) a component which is capable of associating with and effecting anchoring to the particles of the inorganic filler and which provides a steric volume soluble in component A whereby filler particles are dispersed in the organic liquid; and/or
   (E) a component which will provide chemical bonding between the filler and polymer matrix formed by curing the polymerisable organic liquid.

* * * * *

UNITED STATES PATENT AND TRADEMARK OFFICE
CERTIFICATE OF CORRECTION

PATENT NO. : 5,519,081

DATED : May 21, 1996

INVENTOR(S) : ASHTON ET AL

It is certified that error appears in the above-identified patent and that said Letters Patent is hereby corrected as shown below:

In Column 1, correct the "Notice" to read:

The expiration date of this patent shall not extend beyond the expiration date of U.S. Patent 5,519,083.

Signed and Sealed this

Twenty-second Day of October, 1996

Attest:

BRUCE LEHMAN

*Attesting Officer*     *Commissioner of Patents and Trademarks*